United States Patent [19]

Lathrop et al.

[11] 4,407,840
[45] Oct. 4, 1983

[54] INSTANT REFRIED BEAN POWDER AND PROCESS FOR PRODUCING THE SAME

[75] Inventors: Patrick J. Lathrop, Chatsworth; Phyllis C. Rothrock, Tarzana, both of Calif.

[73] Assignee: Carnation Company, Los Angeles, Calif.

[21] Appl. No.: 263,850

[22] Filed: May 15, 1981

[51] Int. Cl.$^3$ .......................... A23B 7/02; A23L 1/36
[52] U.S. Cl. ................................... 426/629; 426/447; 426/460; 426/640; 426/508
[58] Field of Search ............... 426/629, 640, 460, 447, 426/448, 508, 518, 96

[56] References Cited

U.S. PATENT DOCUMENTS

| | | | |
|---|---|---|---|
| 2,279,280 | 4/1942 | Musher | 426/447 |
| 2,475,554 | 7/1949 | Moller | 426/459 |
| 2,657,999 | 11/1953 | Rauch | 426/460 |
| 3,290,159 | 12/1966 | Dorsey et al. | 426/460 |

FOREIGN PATENT DOCUMENTS 700002  12/1964  Canada ............................... 426/447

OTHER PUBLICATIONS

Zaragosa et al., "Canned Refried Beans Prepared from Quick-Cooking Beans", J. Food Science, vol. 42, No. 4, 1977 (pp. 921-923).
Kon et al., "Process Development Adds Scope To Bean Products", Food Products Development, Jul. 1979 (pp. 48 and 49).

*Primary Examiner*—Raymond N. Jones
*Assistant Examiner*—George C. Yeung

[57] ABSTRACT

A process for producing dried bean powder which is instantly reconstitutable with water to form a product having the flavor, color and texture of conventional refried beans. The dried bean powder contains a major proportion of finely divided cooked bean particles and an appreciable quantity of larger size cooked bean skin particulate which provides the reconstituted product with a texture typical of refried beans. In the production of this product, raw beans are blanched in hot water to hydrate the beans, and the hydrated beans and blanch water are cooked under pressure in a suitable pressure cooker. Upon completion of cooking, the beans and water, which are under relatively high pressures and temperatures in the pressure cooker, are discharged from the cooker into a container at ambient temperature and atmospheric pressure to provide an almost instantaneous release of pressure on the cooked beans. This instantaneous release of pressure on the cooked beans results in substantial physical degradation of the beans, thereby forming a bean slurry containing finely divided bean mash, whole bean pieces and bean skin particles. The slurry may then be milled through a screen having a relatively coarse sieve opening, with minimal grinding action, to reduce the whole bean pieces to a relatively small particle size while the bean skin particles are retained. The milled slurry is then dried, such as by applying the slurry to a single or double drum dryer, to a maximum moisture content of about 6%.

10 Claims, No Drawings

4,407,840

INSTANT REFRIED BEAN POWDER AND PROCESS FOR PRODUCING THE SAME

BACKGROUND OF THE INVENTION

This invention relates to the production of an instantly reconstitutable dried bean powder which, upon the addition of water, forms a refried bean product of excellent and uniform quality. More particularly the invention relates to a continuous process for producing a dried bean powder containing bean particulate matter which upon rehydration with water instantly reconstitutes to form a product having the characteristic flavor, texture and color of conventional refried beans.

Refried beans are enjoying increasing popularity as adjuncts to Mexican-style foods, particularly in the food service industry, such as restaurants and fast food outlets which specialize in Mexican-style meals. At present such food service establishments usually either prepare refried beans from whole beans on a batch basis at their individual establishment or use commericaly prepared, canned refried beans. Such conventional sources of refried beans give rise to a number of problems which make their use disadvantageous in the food service industry. For example, the batch preparation of refried beans at the eating establishment is a long, expensive, labor intensive procedure which involves the steps of manually cleaning the whole beans, soaking and cooking the beans for long periods of time, mashing the beans to the proper consistency, and adding the correct amount of flavorings and seasonings. Since the refried beans must often be prepared by persons having little or no culinary skill, it is difficult to maintain the consistency of product characteristics from day to day. Moreover, the characteristics of refried beans prepared at one establishment may vary considerably from those of the product prepared at another establishment. Such lack of uniformity of product characteristics is particularly disadvantageous in a multi-outlet chain of fast food outlets which strive for product uniformity throughout the chain.

The use of canned refried beans is not only expensive, but requires the storage and handling of a large number of bulky cans.

Attempts have been made heretofore to market a dried bean powder which may be rehydrated to form refried beans. However, such prior attempts have not been entirely successful. For example, one commercially available product, which consists of raw ground bean powder and dried whole beans, must be cooked at least 2 hours and yields a product uncharacteristic of conventional refried beans. Other precooked bean powders upon being reconstituted yeild a smooth creamy puree which lacks the bean particulate matter characteristic of conventional refried beans.

SUMMARY OF THE PRESENT INVENTION

The present invention provides a process in which dried beans are processed into precooked bean powder which not only is instantly reconstitutable with water to form refried beans, but which, upon reconstitution, yields a product having the characteristic flavor, texture and color of conventional refried beans, including the presence of particulate bean material. In accordance with this invention, raw beans are cooked, in the presence of water, in a pressure cooker for a period of time sufficient to make them digestable and impart the desired cooked bean flavor and color characteristics to the product. Preferably the dry beans are blanched in hot water to hydrate the beans prior to pressure cooking in order to minimize the time required to cook the beans. The mixture of blanched beans and blanch water is introduced into a pressure cooker, either on a continuous or batch basis, in which the beans are cooked under elevated temperatures and pressures. Upon completion of cooking, the cooked beans and water are discharged from the high internal temperature and pressure of the cooker into atmospheric conditions, so that the beans are subject to an almost instantaneous release of pressure. As the beans are discharged from the pressure cooker, they undergo substantial physical degradation due to the pressure drop across the discharge opening and the flashing off of water as steam, thereby forming a bean slurry containing finely divided bean mash, whole bean pieces, and bean skin particles.

If the whole bean pieces in the slurry are of such a size that they are not readily dried, the slurry may be milled under conditions which provide a minimal grinding action on the slurry, such as by milling the slurry through a screen having a relatively coarse sieve opening. In this manner the larger bean pieces are reduced to a size which may be readily dried, while the bean skin particles and smaller bean pieces are retained in the slurry.

Animal or vegetable fat or oil, such as tallow, lard, soybean oil, and the like, together with seasonings, spices and flavorings, may be introduced into the bean slurry at any convenient point in the process, either before or after pressure cooking, to give the dried bean powder a desired flavor.

After milling, the bean slurry is dried, preferably on either a single or double drum drier, to a maximum moisture content of about 6% by weight. The dried product thus obtained, which has a loose pour density of about 0.24 to 0.28 gms/ml., is instantly reconstitutable in either hot or cold water by adding about two parts of water to one part of the dried bean powder. The reconstituted product has the characteristic flavor, texture and color of conventional refried beans, with the presence of bean skin particulate in the powder giving the reconstituted product a typical refried bean appearance.

Because of the low moisture content of the dried bean powder, the powder, when sealed in plastic bags, may be stored at room temperature for extended periods of time.

DETAILED DESCRIPTION

In accordance with the present invention, raw beans, either whole or split, are first cleaned and washed by any suitable means to remove impurities. Beans of the genus Phaseolus may be used in this invention, including beans such as pinto, pink, red, and the like. Preferably, the raw beans, which typically have a moisture content of between 5–15%, are hydrated to a significantly higher moisture content prior to cooking in order to reduce the period of time required to cook the beans. Accordingly, the moisture content of the raw beans is increased, prior to cooking to about 45% to 60% or more by blanching the beans in any suitable manner in hot water (190° F.–212° F.) for about 25 min.–45 min. Preferably, the dry beans are introduced into a continuous blancher in which the beans are contacted with sufficient water to increase their moisture content to the desired level, such as by contacting the beans with from about 1.25 to 2 parts by weight of water per part by weight of dry beans.

Upon hydration, the beans, together with the blanch water, are introduced into a pressure cooker in which the beans are cooked at a pressure of between about 25 to 75 psi, under time-temperature conditions sufficient to render the beans digestable and impart a cooked bean flavor and color to the resulting product. For example, the mixture of blanched beans and blanch water are passed from the blancher into a pressure cooker in which the beans are cooked at a temperature of about 240° F.–300 ° F. for between 3-20 minutes. If desired, additional water may be added to the mixture of beans and blanch water introduced into the continuous pressure cooker, in an amount between 5%–25% by weight of the beans-blanch water mix.

Preferably, the beans are cooked in a continuous pressure cooker, such as an FMC Model 240 pressure cooker, in which the beans are carried by auger means from the inlet to the discharge end thereof. The auger is rotated at a predetermined speed by a conventional motor in order to control the residence time of the beans in the continuous pressure cooker. Since an elevated pressure is maintained in the continuous pressure cooker, a pressure lock is provided at both the inlet and outlet of the pressure cooker so that the beans and water may be continuously introduced into and discharged from the cooker with a minimal loss of pressure. Conventional rotary pressure locks of the type having a plurality of vanes and spaces therebetween adapted to receive the bean-water mixture are particularly well suited, since the vanes form a substantial seal against loss of pressure maintained in the cooker. Alternatively, the beans may be cooked on a batch basis in a conventional pressure cooker which is provided with a discharge nozzle adjacent the bottom of the cooker.

Upon completion of cooking, the beans and water are discharged from the high internal pressure and temperature of the cooker into a container which is at ambient temperature and atmospheric pressure, in a manner which provides an almost instantaneous release of pressure on the cooked beans. Thus, if the beans are cooked in a batch cooker, upon completion of cooking the discharge nozzle at the bottom of the cooker is opened so that the contents of the cooker are rapidly expelled. When the beans are cooked in a continuous pressure cooker, the cooked beans are discharged through the pressure lock into atmospheric conditions. As the beans are discharged from the high pressure and temperature of the cooker into atmospheric conditions, they undergo substantial physical degradation due to the pressure drop across the discharge opening of the cooker and the flashing off of water as steam. This physical degradation of the beans results in the formation of a bean slurry containing finely divided bean mash, larger whole bean pieces and particles of bean skin. Since the larger whole bean pieces may be difficult to dry, it may be necessary to treat the slurry to reduce these whole bean pieces to a particle size which may be readily dried. However, it is also desired that the dried bean powder obtained by drying the slurry contain a substantial amount of bean particulate matter so that when reconstituted, the reconstituted product has the texture characteristic of conventional refried beans which contains appreciable quantities of bean particles.

In accordance with the present invention, the bean slurry resulting from the discharge of the cooked beans from the pressure cooker may if desired be milled through a screen having a relatively coarse sieve opening (i.e. about 0.25 inch), under conditions which provide a minimal grinding action on the slurry. Processing of the bean slurry in this manner is effective in reducing the whole bean pieces to a particle size which may be more readily dried, but in which the bean skin particles, which are essentially two-dimensional in size, are retained. Excellent results are obtained by passing the slurry through a hammer mill, such as a Fitz mill, having a screen with sieve openings of about 0.25 inch, which is run at slow speed.

The bean slurry being milled must have a solids content such that the slurry is pumpable, but which is not so dilute as to make it unsuitable or impracticable for drying. Preferably the bean slurry to be milled has a solids content in the range of about 20%–35% by weight.

After milling, the bean slurry is dried by any suitable technique, such as by applying the slurry to single or double drum dryers having a surface temperature of about 285°–345° F., until the dried bean slurry has a maximum moisture content of about 6%. When a double drum dryer is used for drying the slurry, a gap of about 0.004–0.008 inch is usually provided between the drums to facilitate drying. Other drying procedures, such as spray drying using an air inlet temperature of about 290°–300° F., may also be used to dry the slurry.

If desired, the dried product may be milled through a screen having a coarse sieve opening to break up larger dried particles, and is filled into suitable moisture-impermeable packaging such as bags made of polyethylene, polypropylene, and the like, which are then sealed.

Flavorings such as animal or vegetable fat or oil, including tallow, lard, beef fat, soybean oil, and the like, and seasonings including salt, onion powder, or a variety of spices and flavorings may be incorporated, if desired, to give the dried product a desired flavor. Such flavorings may be incorporated in the product at any convenient stage in the process. Preferably, the flavorings are added to the hot bean slurry formed upon discharge of the beans from the pressure cooker. According to a preferred embodiment, animal or vegetable fat or oil, in an amount of from about 2%–12% by weight, and seasoning, in an amount of from about 0.5–2% by weight, are added, with mixing, to the container into which the cooked beans are discharged from the continuous pressure cooker. Alternatively, the fat or oil and seasoning may be introduced with the blanched beans and water into the continuous pressure cooker, or dry blended into the product after it has been dried.

As noted hereinabove, while blanching of the beans prior to pressure cooking is preferred, such blanching is not essential to the production of the dried bean powder of this invention. However, if the raw beans are not hydrated prior to cooking, they must be cooked in the pressure cooker for longer periods of time, such as 220° F. for 60 min. to 280° F. for 15 min.

The dried bean powder thus produced contains a major proportion of finely divided cooked bean particles together with an appreciable quantity of cooked bean skin particulate, with the bean skin particulate being substantially larger in size than the bean particles. The presence of such bean skin particulate in the dried powder is an essential feature of the present invention, for when the powder is reconstituted with water, the bean skin particulate provides the reconstituted product with a texture characteristic of conventional refried beans. Without the presence of such particulate matter, the dried powder when reconstituted would form a smooth creamy paste, lacking the particulate matter found in conventional refried beans. The dried bean powder of the present invention has the dark red/brown color characteristic of conventional refried beans.

The dried bean powder of this invention, which has a maximum moisture content of about 6% and a loose pour density of between about 0.24–0.28 gms/ml., is instantly reconstitutable with either hot or cold water. When the dried powder is mixed with water in the ratio of 2–2.5 parts by weight of water per part by weight of powder, the resulting reconstituted product not only has the same dark red/brown color, flavor and texture of commerical refried beans, but also has a consistency, as determined with a Bostwick consistometer at 140° F., of between 2.5–10.0 cm/30 sec., similar to conventional refried beans. The moisture retention characteristics of the reconstituted product, when held in a steam tray at about 165° F., for several hours, is substantially the same as that of commercially available canned refried beans, with the reconstituted product retaining substantially all of its moisture.

The present invention is further illustrated by the following example.

EXAMPLE I

A dry bean powder was produced by the following procedure:

Twenty six pounds of raw, whole pinto beans were blanched in 40 lbs. of hot water having a temperature of 200–212° F., for 30 minutes. Upon completion of blanching, the beans and blanch water together with 5 lbs. of additional water and 1 lb. salt were introduced into a continuous pressure cooker in which the beans were cooked for 10 minutes at 260° F. The cooked beans and water were discharged from the pressure cooker through a pressure lock into a container which was at room temperature and ambient pressure, so that there was an almost instantaneous release of pressure on the beans as they were discharged from the pressure cooker. This resulted in substantial physical degradation of the beans and the formation of a coarse bean slurry which contained whole bean pieces and particles of bean skin in addition to finely divided bean mash. To this hot bean slurry was added 4 lbs. of melted lard and sufficient water to reduce the solids content of the slurry to about 30%–32%. The slurry was then pumped through a Fitz mill equipped with a 14S screen (0.25 in. sieve opening) which was run at slow speed to provide a minimal grinding action, so that the whole bean pieces were reduced in size sufficient to permit drying, while the particles of bean skin in the slurry were retained. The resulting bean slurry was dried on a double drum dryer having a surface temperature of 290° F.–300° F., with an 0.008 in. spacing between the drums. The drums were run at a speed of 4 rpm. the dried bean slurry was removed from the drum dryer and passed through a Fitz mill, without any screen, run at slow speed to break up the larger pieces of dried product.

The dried bean powder thus produced had a moisture content of 5.6% and a loose pour density of 0.26 gms/ml. The dried bean powder was reconstituted instantaneously when 100 gms of bean powder was mixed with 200 ml. of boiling water. The reconstituted product closely simulated conventional refried beans in flavor, color and texture, with the reconstituted product having the same dark red/brown color of conventional commercial refried beans, and having a profusion of particulate matter providing a texture similar to conventional refried beans. The reconstituted product obtained by mixing 100 gms of bean powder with 250 gms, of boiling water had a consistency, as determined with a Bostwick consistometer at 140° F., of 8.8, cms/30 seconds.

In order to provide a comparison between the reconstituted product of this invention and commercial refired beans, a quantity of refried beans was purchased from two separate fast food franchise stores which specialize in Mexican-style foods, and an objective color measurement was made on these samples using a Gardner colorimeter, as well as the reconstituted refried bean product of this invention. The results of this comparison are set out in Table 1.

TABLE 1

| Sample | Lightness (L) | Redness (a) | Yellowness (b) |
|---|---|---|---|
| Present Invention | 33.8 | 12.1 | 11.9 |
| Franchise 1 | 35.1 | 12.6 | 13.3 |
| Franchise 2 | 39.4 | 10.9 | 13.0 |

The foregoing embodiments of the invention have been given for illustrative purposes only and no unnecessary limitations should be understood therefrom, for various modifications will be apparent to those familiar with this art. The scope of this invention is defined in the appended claims.

What is claimed is:

1. A process for producing dried bean powder which is instantly reconstitutable with water to form a product having a characteristic flavor, texture and color of conventional refried beans, which comprises blanching raw beans in hot water in an amount of from 1.25 to 2 parts by weight of water per part by weight of beans for a period of time sufficient to increase the moisture content of the beans to a minimum of about 40%, introducing the beans and blanch water into a pressure cooker in which the beans are cooked in the blanch water at a pressure of between about 25 to 75 psi under time-temperature conditions sufficient to render the beans digestable and impart a cooked bean flavor and color to the beans, discharging the cooked beans and water from the pressure cooker into a container which is at ambient temperature and atmospheric pressure to provide an almost instantaneous release of pressure on the cooked beans whereby the beans are physically degraded to form a bean slurry having a solids content of about 25%–35% by weight and containing finely divided bean mash, whole bean pieces and bean skin particles, milling the bean slurry through a screen having a relatively coarse sieve opening, with minimal grinding action, so that the whole bean pieces in the slurry are reduced to a relatively small particle size while the bean skin particles are retained in the slurry, and drying the milled bean slurry to a maximum moisture content of about 6% to thereby provide a dried bean powder containing a major proportion of finely divided cooked bean particles and an appreciable quantity of bean skin particulate, which is substantially larger in size than said cooked bean particles, said powder being instantly reconstitutable with water to form a product containing particulate matter and having the flavor, texture and color characteristics of conventional refried beans.

2. The process defined in claim 1 in which the beans are blanched at a temperature of about 190° F.-212° F. for about 25-45 min.

3. The process defined in claim 1 in which the hydrated beans are cooked at a temperature of between about 240° F.-300° F. for between 3-20 minutes.

4. The process defined in claim 1 in which the bean slurry is milled by passing the slurry through a hammer mill having a screen with sieve openings of about 0.25 in., and the hammer mill is run at slow speed.

5. The process defined in claim 1 in which the bean slurry is dried by applying the slurry to one or more drum dryers having a surface temperature of about 285° F.-345° F.

6. The process defined in claim 1 in which from about 2%-12% by weight of animal or vegetable fat or oil and from about 0.5%-2% by weight of seasoning are incorporated in the bean slurry prior to drying.

7. A dried bean powder which is instantly reconstitutable with water to form a product having the flavor, color, texture characteristics and particulate matter of conventional refried beans, said powder containing a major proportion of finely divided cooked bean particles and an appreciable quantity of cooked bean skin particulate, and having a maximum moisture content of about 6% and a loose pour density of between about 0.024-0.28 gms/ml.

8. A process for producing dried bean powder which is instantly reconstitutable with water to form a product having the characteristic flavor, texture and color of conventional refried beans, which comprises introducing raw beans and water in an amount of from 1.25 to 2 parts by weight of water per part by weight of beans into a continuous pressure cooker in which the beans are subjected to heat and pressure for a period of time sufficient to hydrate and cook the beans, discharging the cooked beans and water from the pressure cooker into a container which is at ambient temperature and atmospheric pressure to provide an almost instantaneous release of pressure on the cooked beans, thereby causing physical degradation of the beans and the formation of a bean slurry containing finely divided bean mash, whole bean pieces and bean skin particles, milling the slurry through a screen having a relatively coarse sieve opening, with minimal grinding action, so that the whole bean pieces in the slurry are reduced in size while the bean skin particles are retained in the slurry, and drying the bean slurry to a maximum moisture content of about 6% to thereby provide a dried bean powder containing a major proportion of finely divided cooked bean particles and an appreciable quantity of cooked bean skin particulate.

9. The process defined in claim 8 in which the beans are hydrated and cooked at a pressure of between 30-50 psi.

10. The process defined in claim 8 in which the beans are hydrated and cooked at a temperature and for a period of time within the range of 220° F. for 60 min. to 280° F. for 15 min.

* * * * *

UNITED STATES PATENT OFFICE
CERTIFICATE OF CORRECTION

PATENT NO. : 4,407,840
DATED : October 4, 1983
INVENTOR(S) : Patrick J. Lathrop and Phyllis C. Rothrock It is certified that error appears in the above—identified patent and that said Letters Patent are hereby corrected as shown below:

Column 1, line 21, "commericaly" should read -commercially-

Column 6, line 9, "fired" should read -fried-

Claim 7, last line, "0.024" should read -.024-

Signed and Sealed this

Twelfth Day of June 1984

[SEAL]

Attest:

GERALD J. MOSSINGHOFF

Attesting Officer     Commissioner of Patents and Trademarks